US006671577B2

(12) United States Patent
Barnum et al.

(10) Patent No.: US 6,671,577 B2
(45) Date of Patent: Dec. 30, 2003

(54) SYSTEM AND METHOD FOR DIRECTLY CONNECTING AN ADVANCED FACER CANCELER SYSTEM TO A DELIVERY BAR CODE SORTER

(75) Inventors: Timothy B. Barnum, Severna Park, MD (US); George Laws, Goldvein, VA (US); Leung M. Shiu, Gaithersburg, MD (US); James E. Goodbar, III, Springfield, VA (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 09/849,994

(22) Filed: May 8, 2001

(65) Prior Publication Data

US 2002/0069187 A1 Jun. 6, 2002

Related U.S. Application Data

(60) Provisional application No. 60/250,146, filed on Dec. 1, 2000.

(51) Int. Cl.[7] ........................................ G06F 7/00
(52) U.S. Cl. ..................... 700/223; 700/224; 700/228; 700/226; 209/569
(58) Field of Search .............................. 700/223, 224, 700/226, 228; 209/569; 705/405, 408

(56) References Cited

U.S. PATENT DOCUMENTS 4,083,555 A * 4/1978 Irvine et al. .................. 271/10
4,119,194 A * 10/1978 Freeman et al. ............ 198/400
4,815,374 A * 3/1989 Remy ......................... 101/426
5,025,475 A * 6/1991 Okabe ........................... 382/1
5,293,319 A 3/1994 DeSha et al.
5,651,445 A * 7/1997 Stevens et al. ............. 198/447
5,926,392 A * 7/1999 York et al. ............. 364/478.11
5,971,161 A * 10/1999 Branecky et al. ........... 209/657
6,019,364 A * 2/2000 Svyatsky et al. ........... 271/186
6,045,278 A * 4/2000 Kubatzki et al. ........... 400/635
6,178,410 B1 1/2001 Kunde et al.
6,179,288 B1 * 1/2001 Bezelga et al. ............. 271/225
6,208,910 B1 * 3/2001 Michael et al. ............. 700/225
6,247,774 B1 * 6/2001 Mueller ......................... 347/2
6,282,525 B1 8/2001 Kubatzki et al.
6,389,327 B1 5/2002 Thiel
6,415,336 B1 7/2002 Sansone
6,415,983 B1 7/2002 Ulvr et al.

* cited by examiner

*Primary Examiner*—Donald P. Walsh
*Assistant Examiner*—Michael E. Butler
(74) *Attorney, Agent, or Firm*—Finnegan, Henderson, Farabow, Garrett & Dunner, LLP

(57) ABSTRACT

Systems and methods that allow for orienting and delivering mail between a postage verifier and a mail sorter. A postage verifier incudes an optical character reader for decoding addresses on mail pieces that do not have bar codes. A reverter orients mail from the postage verifier into a position required for processing by the mail sorter. A combination of mail carrying modules carry the mail from the reverter to the mail sorter. The mail sorter prints bar code information on mail lacking bar codes, when the data is available, and sorts the mail based on the bar code information.

10 Claims, 4 Drawing Sheets

SYSTEM AND METHOD FOR DIRECTLY CONNECTING AN ADVANCED FACER CANCELER SYSTEM TO A DELIVERY BAR CODE SORTER

This application claims priority to provisional U.S. patent application Ser. No. 60/250,146 filed Dec. 1, 2000, the contents of which are herein incorporated by reference.

BACKGROUND OF THE INVENTION

This invention relates generally to the field of mail processing, and more specifically to the field of processing and directing mail between machines.

Mail processing systems must accurately and quickly process large amounts of mail. The performance and cost of conventional mail processing are hindered by the need for many operators and the time required to manually move mail between machines.

Conventional mail systems process stamped mail through a plurality of separate machines including an advanced facer-canceler system/input subsystem (AFCS/ISS), an optical character reader (OCR) machine, and a delivery bar code sorter/output subsystem (DBCS/OSS). AFCS/ISS places incoming mail into a single file line in a pinch belt, checks for appropriate postage on mail, cancels the postage, and places the mail in stackers. AFCS/ISS positions the mail upright between a pair of pinch belts with either the stamp leading and the address on the front side or the stamp trailing and the address on the back side. AFCS/ISS obtains a picture image of each piece of mail and prints a mail identifier on each mail piece that is stored along with the image. The image is used to determine mail type such as printed address and script address. After canceling the postage, AFCS/ISS sorts the mail into one or more bins based on mail type. Each mail type has two bins, one for mail with the stamp leading and one for mail with the stamp trailing.

The machines that next process the mail, such as DBCS/OSS, require that all the mail be positioned with the stamp leading. An operator takes the stamp trailing mail from one bin and places it in a stamp leading position to combine with the mail in the stamp leading bin. Based on the mail type, the operator then moves the mail to the next processing point. Pre-bar coded mail is taken directly to the DBCS/OSS. Bar codes on the mail indicate the destination of the mail piece. Printed and scripted mail is taken to the OCR to have the mail processed to determine what bar code label is appropriate for a given piece of mail. OCR prints a bar code onto the mail. Bar-coded mail is then taken to a DBCS/OSS for further processing.

DBCS/OSS sorts the mail into a plurality of stackers based on the bar code data which reflects the mail destination.

The present invention reduces the number of processing operators required and speeds the processing of the mail.

SUMMARY OF THE INVENTION

Systems and methods consistent with the present invention process and carry mail between a postage verifier and a mail sorter.

A mail processing interface is provided between a postage verifier and a mail sorter. The interface includes a reverter for orienting mail received from the postage verifier, a first mail carrying module configured to receive mail from the reverter, a transport configured to receive mail from the first mail carrying module, and a second mail carrying module configured to receive mail from the transport and to output mail to the mail sorter.

A mail processing system includes a postage verifier, a reverter orienting mail received from the postage verifier, a first mail carrying module configured to receive mail from the reverter, a transport configured to receive mail from the first mail carrying module, a second mail carrying module configured to receive mail from the transport, and a mail sorter configured to receive mail from the second mail carrying module.

A processing method processes mail through a postage verifier having an optical character reader, mail interface system, and a mail sorter. The mail interface system includes an upward module carrying mail up to an overhead transport positioned at a height above an output of the postage verifier, and a downward module carrying mail down from the overhead transport to the mail sorter. The method includes verifying and canceling postage, positioning mail pieces in a same configuration in a single file line, directing mail pieces up the upward module, directing mail pieces through the overhead transport, directing mail pieces down the downward module to a mail sorter, and sorting the mail based on destination.

BRIEF DESCRIPTION OF THE DRAWINGS

The accompanying drawings, which are incorporated in and constitute a part of this specification, illustrate one embodiment of the invention and, together with the description, serve to explain the objects, advantages, and principles of the invention. In the drawings.

DETAILED DESCRIPTION OF THE PREFERRED EMBODIMENTS

Reference will now be made in detail to embodiments consistent with this invention that are illustrated in the accompanying drawings. The same reference numbers in different drawings generally refer to the same or like parts.

Current mail processing systems require an operator to arrange and carry mail between an AFCS/ISS, OCR and DBCS/OSS. Systems and methods consistent with the present invention provide an OCR at a postage verifier, such as the AFCS/ISS, and include a direct connect system to allow mail to be automatically processed and transported between the postage verifier and a mail sorter, such as the DBCS/OSS.

Figure 1:
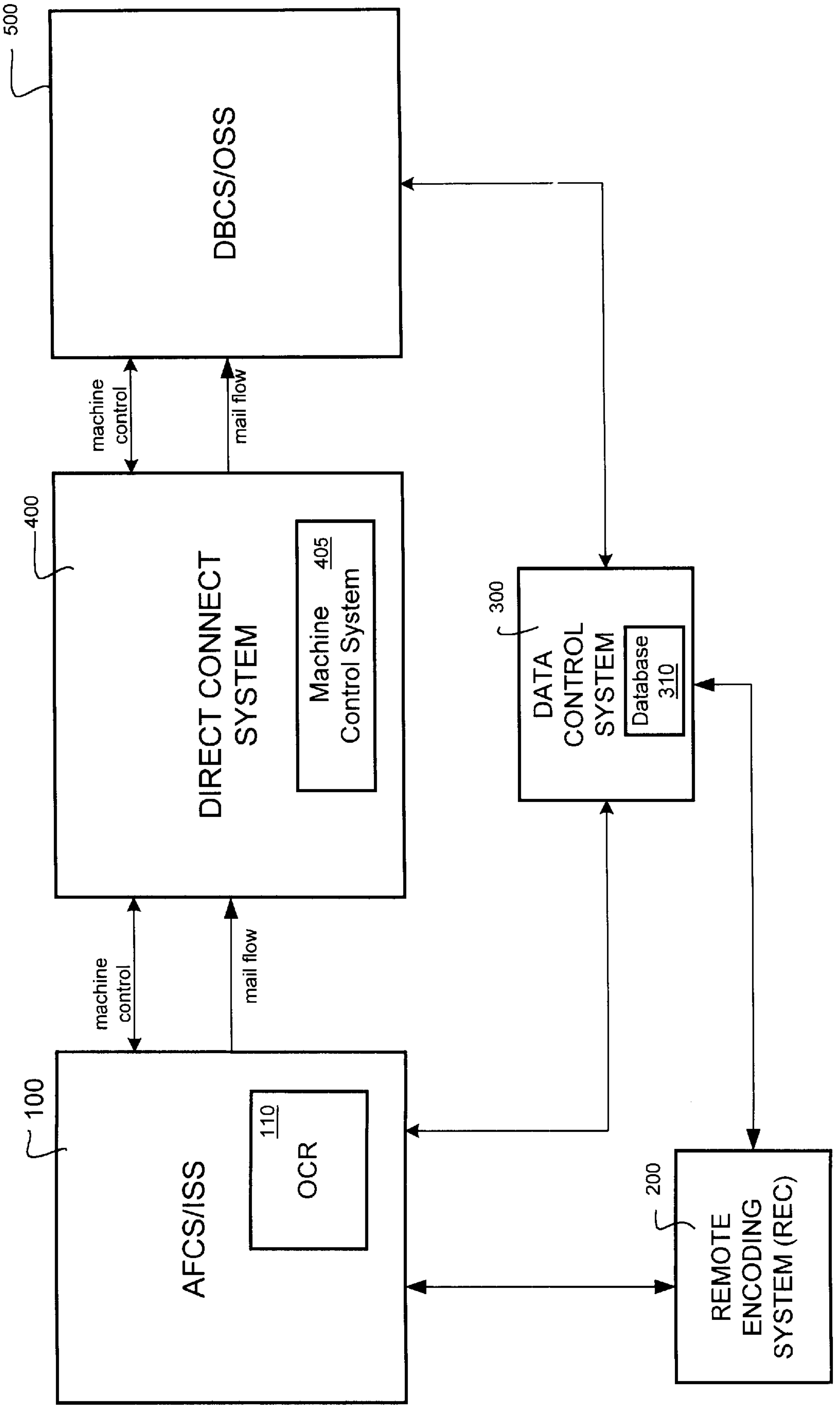
FIG. 1 is a block diagram of the mail processing system consistent with methods and systems of the present invention.

FIG. 1 shows a mail processing system consistent with the present invention. The system includes AFCS/ISS 100, OCR 110, remote encoding system (REC) 200, data control system 300, database 310, direct connect system 400, machine control system 405, and DBCS/OSS 500. AFCS/ISS 100, performs the same as the conventional AFCS/ISS described above, and further includes an OCR 110 and a connection to direct connect system 400. AFCS/ISS 100 directs processed mail to either direct connect system 400 or to a set of stackers. Direct connect system 400 arranges and carries mail to DBCS/OSS 500. DBCS/OSS 500 performs like the conventional DBCS/OSS described above, and additionally accepts mail from the direct connect system 400 and prints bar codes on mail as needed.

Data control system 300 is connected to AFCS/ISS 100, DBCS/OSS 500, and REC 200. Data control system 300 organizes bar code information and mail identifiers. Data control system 300 includes a processor and memory with database 310.

Figure 2:
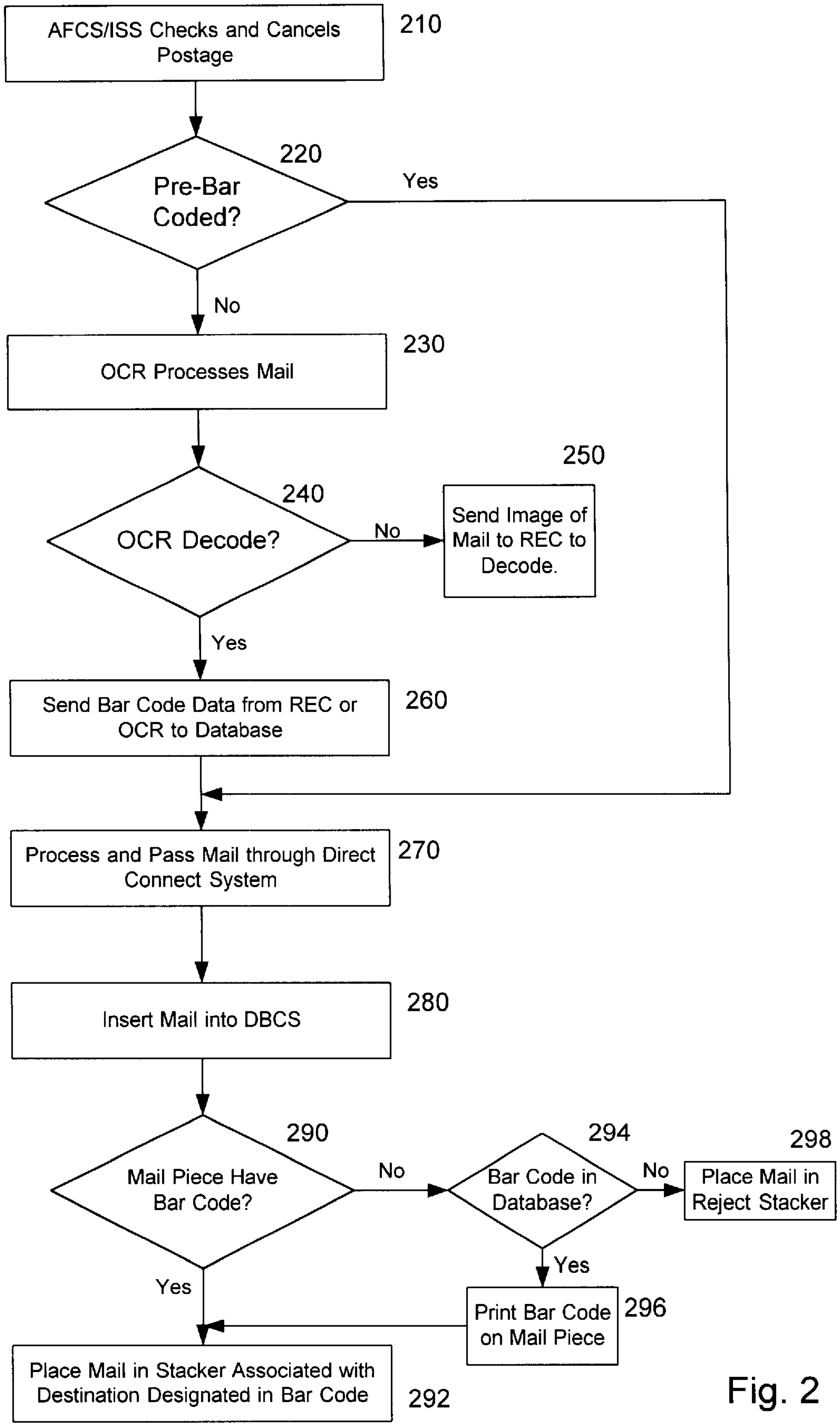
FIG. 2 is a flowchart showing steps for processing mail using the system shown in FIG. 1.
Figure 3:
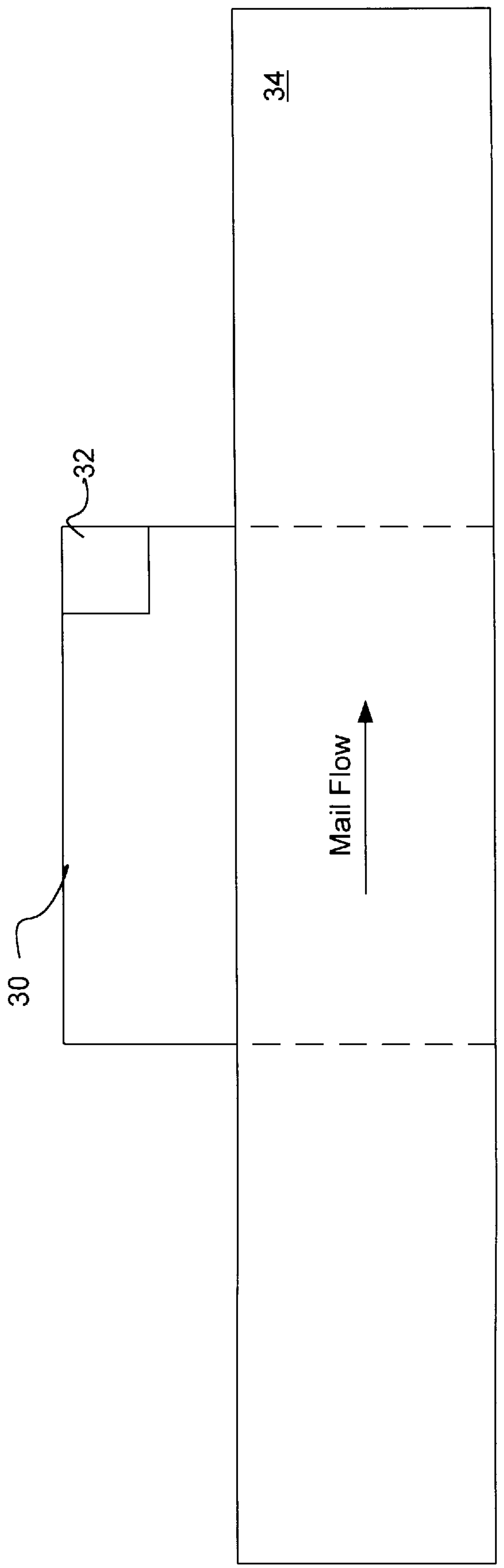
FIG. 3 shows a piece of mail in a pair of belts positioned with the stamp leading.

FIG. 2 is a flowchart showing steps for processing mail using the elements shown in FIG. 1. AFCS/ISS 100 checks for postage on received mail and stamps a cancellation mark on the mail (step 210). AFCS/ISS 100 also prints a mail piece identifier on each piece of mail. AFCS/ISS 100 determines if a mail piece already contains a bar code (step 220) and, if so, forwards the mail piece to direct connect system 400. Mail that does not have a bar code is processed by OCR 110 located within AFCS/ISS 100 (step 230). OCR 110 attempts to analyze address information from an optical image of the mail, obtained by AFCS/ISS 100, to generate bar code data for the mail piece. If OCR 110 is not able to decode an address (step 240), the image of the mail piece is sent to REC 200 (step 250). Individuals located at REC 200 view the image of the mail piece and input bar code information. The bar code information determined by OCR 110 or input at REC 200 is forwarded to data control system 300 for storage in database 310 along with the mail piece identifier (step 260). AFCS/ISS 100 outputs mail to direct connect system 400 (step 270). Direct connect system 400 places all mail pieces in the same orientation, such as stamp leading, and carries the mail over a work area and back down to enter DBCS/OSS 500 (step 280). FIG. 3 shows a piece of mail 30 being carried in an upright position in a pair of pinch belts 34 (one shown) with stamp 32 leading.

DBCS/OSS 500 directs mail into a plurality of stackers based on the destination indicated on a bar code on a mail piece. DBCS/OSS 500 determines if a mail piece has a bar code (step 290). DBCS/OSS 500 uses the bar code to direct the mail piece to a stacker associated with the destination (step 292). If a mail piece does not have a bar code, DBCS/OSS 500 queries database 310 at data control system 300 using the mail piece identifier, requesting bar code information (step 294). If bar code information is in database 310, DBCS/OSS 500 receives the bar code information from data control system 300, prints the bar code on the mail piece (step 296) and directs the mail to the appropriate destination stacker (step 292). Otherwise, the mail is placed in a reject stacker (step 298). About fifteen percent of the mail will be placed in the reject stacker. Some of these pieces may be rejected because the individuals at REC 200 have not entered the bar code information in time. The reject pieces may be re-run through the DBCS/OSS 500 at a later time after REC 200 has entered more bar code data into database 310.

Figure 4:
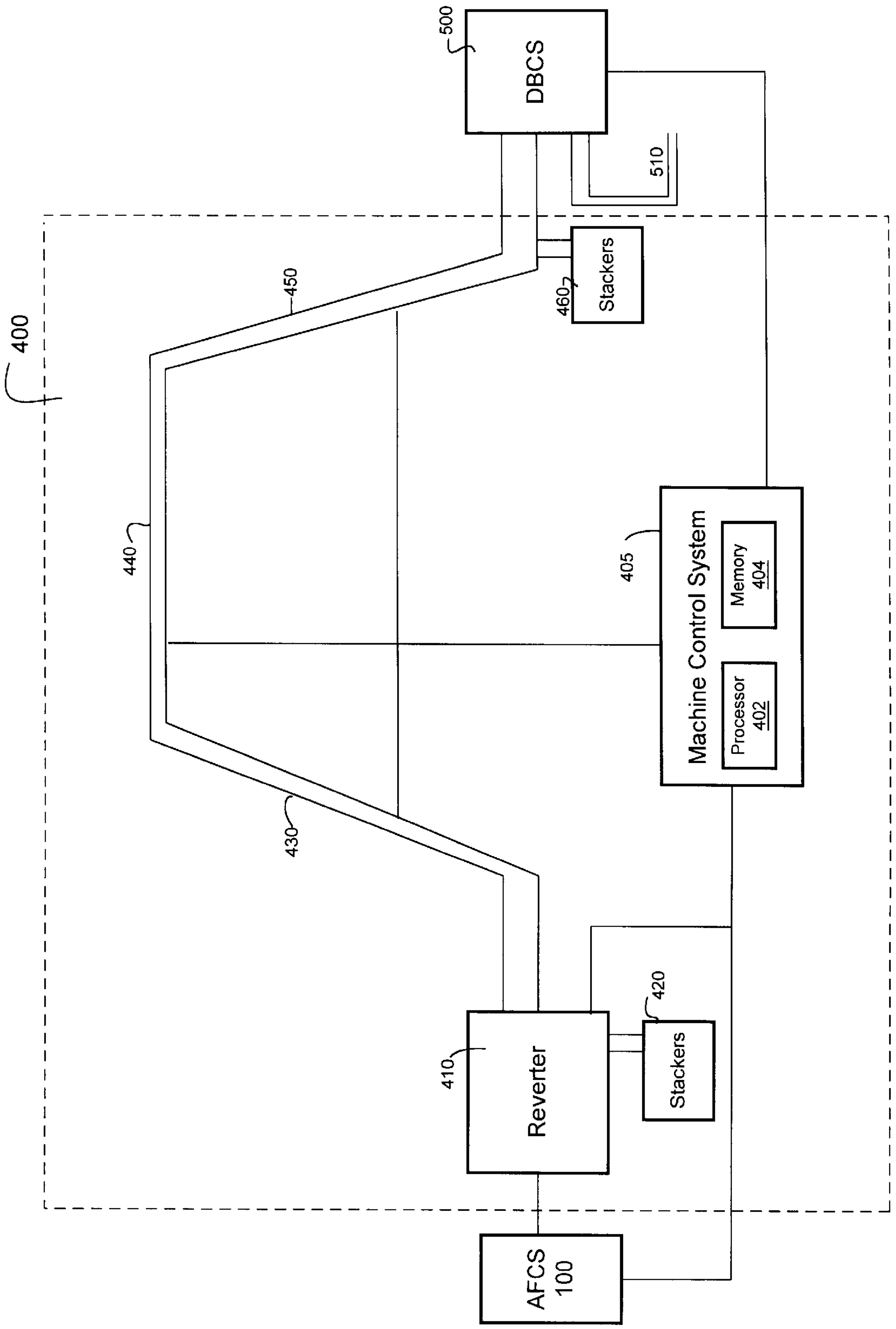
FIG. 4 shows the elements of the direct connect system consistent with methods and systems of the present invention.

In FIG. 4, machine control system 405 in direct connect system 400 is connected to each of the elements in direct connect system 400, AFCS/ISS 100 and DBCS/OSS 500 to control whether mail is deposited in stackers or directed to the next machine in line. Machine control system 405 may also select the source of mail to be processed by the DBCS/OSS 500. Machine control system 405 includes a processor 402, memory 404 and sensors. Sensors are located throughout each of the connected elements to note any failures, such as paper jams, and report the failure through the control system to an operator. A control panel allows an operator to receive information from machine control system 405 and to control the overall system.

FIG. 4 shows the elements of direct connect system 400. Mail is received from AFCS/ISS 100 at a reverter 410 piece by piece in a pinch belt. Reverter 410 detects that a piece is received preferably by use of a photodetector. Reverter 410 tracks the spacing between pieces using the photodetector and if pieces are too close together for processing, a mail piece is output to stackers 420. There may be one or more stacks in stackers 420 facing either toward or away from an operator. In one embodiment, three stackers facing toward the operator are used, one for pre-bar coded mail, a second for script and printed mail, and a third for rejected mail.

AFCS/ISS 100 keeps track of the order in which it is sending the pieces of mail and signals the reverter 410 indicating whether a piece is stamp leading or stamp trailing. If the stamp is trailing, reverter 410 directs the mail piece into a reverting section to turn the piece of mail around so that the address is facing out and the stamp is leading as shown in FIG. 3. If a piece of mail is already in the stamp leading position, the mail piece bypasses the reverting section. After turning a piece of mail around, reverter 410 inserts the piece of mail back into the same order in the mail flow.

Reverter 410 receives information about the mail type of each mail piece from AFCS/ISS 100. An operator, at the control panel associated with machine control system 405, may direct the reverter to sort mail, or a specific type of mail, into stackers 420. Machine control system 405 may direct reverter 410 to place mail in stacker 420 if there is an error downline, such as when the upward module 430 is stopped. In an alternative embodiment, AFCS/ISS 100 may place mail directly into stackers 420.

AFCS/ISS 100 and DBCS/OSS 500 are typically located across a pedestrian aisle. Upward module 430 carries the mail up using a pair of pinch belts to overhead transport 440. Overhead transport 440 uses a pair of pinch belts to carry the mail across to downward module 450. Upward module 430, overhead transport 440, and downward module 450, may include turns and angles as needed, such as to avoid other equipment. Downward module 450 carries the mail down using a pair of pinch belts to DBCS/OSS 500. If DBCS/OSS 500 is not accepting mail, machine control system 405 may divert mail to stackers 460. Stackers 460 may include one or more stacks. In one embodiment, there are two stacks at stackers 460. In another embodiment, stackers 460 may feed mail to DBCS 500.

DBCS/OSS 500 receives mail from either downward module 450 or feeder 510. Machine control system 405 controls which source DBCS/OSS 500 uses to receive mail. An operator at DBCS/OSS 500 may also select which source should receive mail. This allows for DBCS/OSS 500 to be used separate from direct connect system 400. For example, if DBCS/OSS 500 is down and mail collects in stackers 460, an operator may place the mail from stackers 460 into feeder 510 once DBCS/OSS 500 is operational. If there is an error with direct connect system 400 or AFCS/ISS 100, DBCS/OSS 500 may be used to process mail inserted into feeder 510.

The upward module 430, overhead transport 440, and downward module 450 may be bypassed by using stacker 420 and feeder 510. An operator may carry mail from stacker 420 to feeder 510 for processing by DBCS/OSS 500.

In one embodiment, reverter 410, stackers 420, upward module 430, overhead transport 440, downward module 450 and stackers 460 have indicating lights within the view of an operator that indicate the location of any jams.

In one embodiment, the gap between mail pieces is 30+/−5 msec and the reverter module may reject pieces of mail that have a gap of less than 25 msec.

In another embodiment, the overhead transport is at a height of less than eleven feet. In yet another embodiment, the overhead transport may be positioned below the height of a person or at the height of the AFCS/ISS if desired.

There are many variations that may be made consistent with the present invention. For example, in another embodiment, the reverter 410 is located after the downward module 450. The reverter may also position mail in different orientations based on what is required by machines down-line. A database that stores mail identifiers and related information may be located anywhere accessible to DBCS/OSS. Other postage verifiers may be used in place of the AFCS/ISS, and other bar code sorting machines may be used in place of DBCS/OSS.

In general, the mail carrying elements of the preferred embodiment are pinch belts. However, the mail carrying areas may have sections where the belts are loose, leveler sections that fix skewed pieces of mail, and belt areas. Structure other than pinch belts may be used such as belts, vacuum assisted belts, slotted belt chains, or rollers.

In another embodiment, the AFCS/ISS may send specific types of mail to the direct connect system, such as script and print, and send other types of mail to stackers 420 or stackers 460, such as pre-bar coded mail.

The foregoing description is presented for purposes of illustration and description. It is not exhaustive and does not limit the invention to the precise form disclosed. Modifications and variations are possible in light of the above teachings or may be acquired from practicing the invention. The scope of the invention is defined by the claims and their equivalents.

What is claimed is:

1. A mail processing interface between a postage verifier and a mail sorter, said interface comprising:

a reverter configured to orient mail received from the postage verifier receive mail type information from the postage verifier, and perform one of sorting mail in a first mail sorter and selecting at least one specific mail type for placement into at least one stacker;

a first mail carrying module configured to receive mail from the reverter;

a transport configured to receive mail from the first mail carrying module;

a second mail carrying module configured to receive mail from the transport and to output mail to a second mail sorter.

2. The interface of claim 1 wherein the transport is positioned at a height above an output of the postage verifier.

3. The interface of claim 2 wherein the first mail carrying module carries mail upward from the output of the postage verifier to the transport and wherein the second mail carrying module carries mail downward from the transport to an input of the second mail sorter.

4. The interface of claim 1 wherein said reverter places all mail pieces in the same configuration.

5. The interface of claim 4 wherein said reverter positions all mail pieces with postage leading.

6. The interface of claim 1 wherein said first mail carrying module, said transport, and said second mail carrying module include a pair of pinch belts.

7. The interface of claim 1 further comprising at least one stacker for receiving mail from the reverter.

8. The interface of claim 1 further comprising at least one stacker for receiving mail from the second mail carrying module.

9. The interface of claim 8 wherein said at least one stacker feed mail to the second mail sorter.

10. The interface of claim 1 wherein the transport is positioned at a height of an output of the postage verifier.

* * * * *